(12) United States Patent
Penny

(10) Patent No.: US 8,308,005 B2
(45) Date of Patent: Nov. 13, 2012

(54) PREFORM AND CONTAINER HAVING DEBOSSED SUPPORT FLANGE

(75) Inventor: Michael E. Penny, Saline, MI (US)

(73) Assignee: Amcor Limited, Hawthorn (AU)

( * ) Notice: Subject to any disclaimer, the term of this patent is extended or adjusted under 35 U.S.C. 154(b) by 1077 days.

(21) Appl. No.: 12/011,975

(22) Filed: Jan. 30, 2008

(65) Prior Publication Data
US 2009/0188888 A1 Jul. 30, 2009

(51) Int. Cl.
*B65D 41/04* (2006.01)
(52) U.S. Cl. ........... 215/329; 215/382; 215/252; 215/42
(58) Field of Classification Search .................. 215/382, 215/329, 40, 42, 46, 250, 252
See application file for complete search history.

(56) References Cited

U.S. PATENT DOCUMENTS

| | | | | |
|---|---|---|---|---|
| 4,007,848 A | * | 2/1977 | Snyder | 215/44 |
| 4,156,490 A | * | 5/1979 | Peraboni | 215/252 |
| 4,180,175 A | * | 12/1979 | Virog et al. | 215/252 |
| 4,417,666 A | * | 11/1983 | Roberts | 215/256 |
| 4,541,536 A | * | 9/1985 | Davis et al. | 215/252 |
| 4,566,600 A | * | 1/1986 | Chang | 215/371 |
| 4,756,438 A | * | 7/1988 | Ryder | 215/252 |
| 4,895,265 A | * | 1/1990 | Luch et al. | 215/43 |
| 5,875,906 A | * | 3/1999 | Price et al. | 215/252 |
| 6,016,930 A | * | 1/2000 | Mathes et al. | 215/216 |
| 6,056,136 A | * | 5/2000 | Taber et al. | 215/252 |
| 6,059,134 A | * | 5/2000 | Long, Jr. | 215/252 |
| 6,279,766 B1 | * | 8/2001 | Jones et al. | 215/219 |
| 6,305,579 B1 | * | 10/2001 | Long, Jr. | 222/153.06 |
| 6,659,297 B2 | * | 12/2003 | Gregory et al. | 215/252 |
| 7,510,094 B1 | * | 3/2009 | Willis et al. | 215/218 |
| 7,694,835 B1 | * | 4/2010 | Montgomery | 215/329 |
| 2003/0116522 A1 | * | 6/2003 | Julian et al. | 215/252 |
| 2003/0124374 A1 | * | 7/2003 | Bromley et al. | 428/542.8 |
| 2005/0263476 A1 | * | 12/2005 | Harrison et al. | 215/44 |
| 2007/0210026 A1 | * | 9/2007 | Darr et al. | 215/44 |
| 2008/0093363 A1 | * | 4/2008 | Pedlar | 220/276 |

FOREIGN PATENT DOCUMENTS

| | | |
|---|---|---|
| EP | 0250065 | 12/1987 |
| FR | 2352719 | 12/1977 |

* cited by examiner

*Primary Examiner* — Anthony Stashick
*Assistant Examiner* — Christopher McKinley
(74) *Attorney, Agent, or Firm* — Harness, Dickey & Pierce, P.L.C.

(57) ABSTRACT

The present disclosure provides a container and a method of making a container. In one example, the container includes an upper portion having a finish defining a longitudinal axis and an opening into the container. A shoulder region is integrally formed with and extends from the upper portion. A sidewall portion extends from the shoulder region to a base portion. A tamper evident (TE) band is formed on the finish and defines an outermost surface of the plastic container above the shoulder region. A neck defining a cylindrical sidewall is integrally formed with and extends between the finish and the shoulder region. The neck defines a uniform cylindrical sidewall along its entire height between the finish and the shoulder region. The container further includes a debossed support flange defined on the upper portion. The debossed support flange defines a diameter less than a diameter defined by the TE band.

19 Claims, 8 Drawing Sheets

PREFORM AND CONTAINER HAVING DEBOSSED SUPPORT FLANGE

TECHNICAL FIELD

This disclosure generally relates to containers for retaining a commodity, such as a solid or liquid commodity. More specifically, this disclosure relates to a blown polyethylene terephthalate (PET) container having a debossed support flange.

BACKGROUND

As a result of environmental and other concerns, plastic containers, more specifically polyester and even more specifically polyethylene terephthalate (PET) containers are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left(\frac{\rho - \rho_a}{\rho_c - \rho_a}\right) \times 100$$

where $\rho$ is the density of the PET material; $\rho_a$ is the density of pure amorphous PET material (1.333 g/cc); and $\rho_c$ is the density of pure crystalline material (1.455 g/cc).

Container manufacturers use mechanical processing and thermal processing to increase the PET polymer crystallinity of a container. Mechanical processing involves orienting the amorphous material to achieve strain hardening. This processing commonly involves stretching an injection molded PET preform along a longitudinal axis and expanding the PET preform along a transverse or radial axis to form a PET container. The combination promotes what manufacturers define as biaxial orientation of the molecular structure in the container. Manufacturers of PET containers currently use mechanical processing to produce PET containers having approximately 20% crystallinity in the container's sidewall.

Thermal processing involves heating the material (either amorphous or semi-crystalline) to promote crystal growth. On amorphous material, thermal processing of PET material results in a spherulitic morphology that interferes with the transmission of light. In other words, the resulting crystalline material is opaque, and thus, generally undesirable. Used after mechanical processing, however, thermal processing results in higher crystallinity and excellent clarity for those portions of the container having biaxial molecular orientation. The thermal processing of an oriented PET container, which is known as heat setting, typically includes blow molding a PET preform against a mold heated to a temperature of approximately 250° F.-350° F. (approximately 121° C.-177° C.), and holding the blown container against the heated mold for approximately two (2) to five (5) seconds. Manufacturers of PET juice bottles, which must be hot-filled at approximately 185° F. (85° C.), currently use heat setting to produce PET bottles having an overall crystallinity in the range of approximately 25%-35%.

Typically, an upper portion of the plastic container defines an opening. This upper portion is commonly referred to as a finish and includes some means for engaging a cap or closure to close off the opening. In the traditional injection-stretch blow molding process, the finish remains substantially in its injection molded state while the container body is formed below the finish. The finish may include at least one thread extending radially outwardly around an annular sidewall defining a thread profile. In one application, a closure member or cap may define a complementary thread, or threads, that are adapted to cooperatively mate with the threads of the finish.

An alternative method may be used to form the finish portion of the container. This alternative method is known as a blown finish. During this alternative process, the finish portion of the container is created in the blow mold utilizing a process similar to the blow molding process described above. This alternative process enables production of a lighter-weight finish portion, and thus container, than is possible through the traditional injection molding production method.

Typically, the finish of the container includes an outwardly facing support flange. Such a support flange can be used to carry or orient a preform through and at various stages of manufacture. For example, the preform may be carried by the support flange, the support flange may be used to aid in positioning the preform in a mold, or an end consumer may use the support flange to carry the plastic container once manufactured.

SUMMARY

Accordingly, the present disclosure provides a container and a method of making a container. In one example, the container includes an upper portion including a finish defining a longitudinal axis and an opening into the container. A shoulder region is integrally formed with and extends from the upper portion. A sidewall portion extends from the shoulder region to a base portion. The base portion closes off an end of the container. A tamper evident (TE) band is formed on the finish and defines an outermost surface of the plastic container above the shoulder region. A neck defining a cylindrical sidewall that is integrally formed with and extends from the finish and the shoulder region.

According to additional features, the neck defines a uniform cylindrical sidewall along its entire height between the finish and the shoulder region. The TE band defines a first diameter at the outermost surface. The container further includes a debossed support flange defined on the upper portion. The debossed support flange defines a second diameter. The first diameter is greater than the second diameter.

Additional benefits and advantages of the present disclosure will become apparent to those skilled in the art to which the present disclosure relates from the subsequent description and the appended claims, taken in conjunction with the accompanying drawings.

DETAILED DESCRIPTION

The following description is merely exemplary in nature, and is in no way intended to limit the disclosure or its application or uses.

Figure 1:
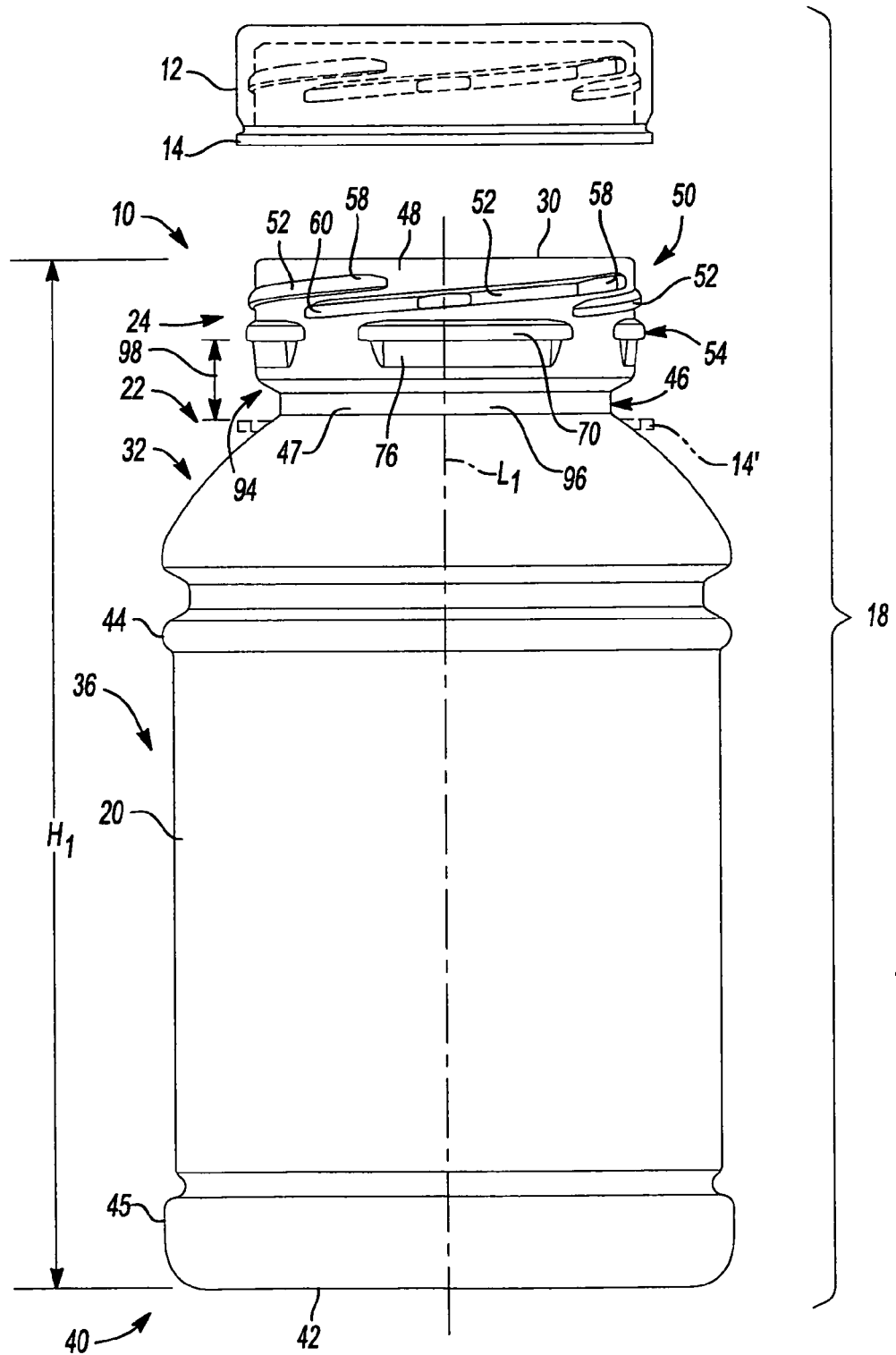
FIG. 1 is a side elevational view of a plastic container constructed in accordance with the teachings of the present disclosure shown with an exemplary cap having a breakaway band attached to the cap prior to initial capping onto the plastic container.
Figure 2:
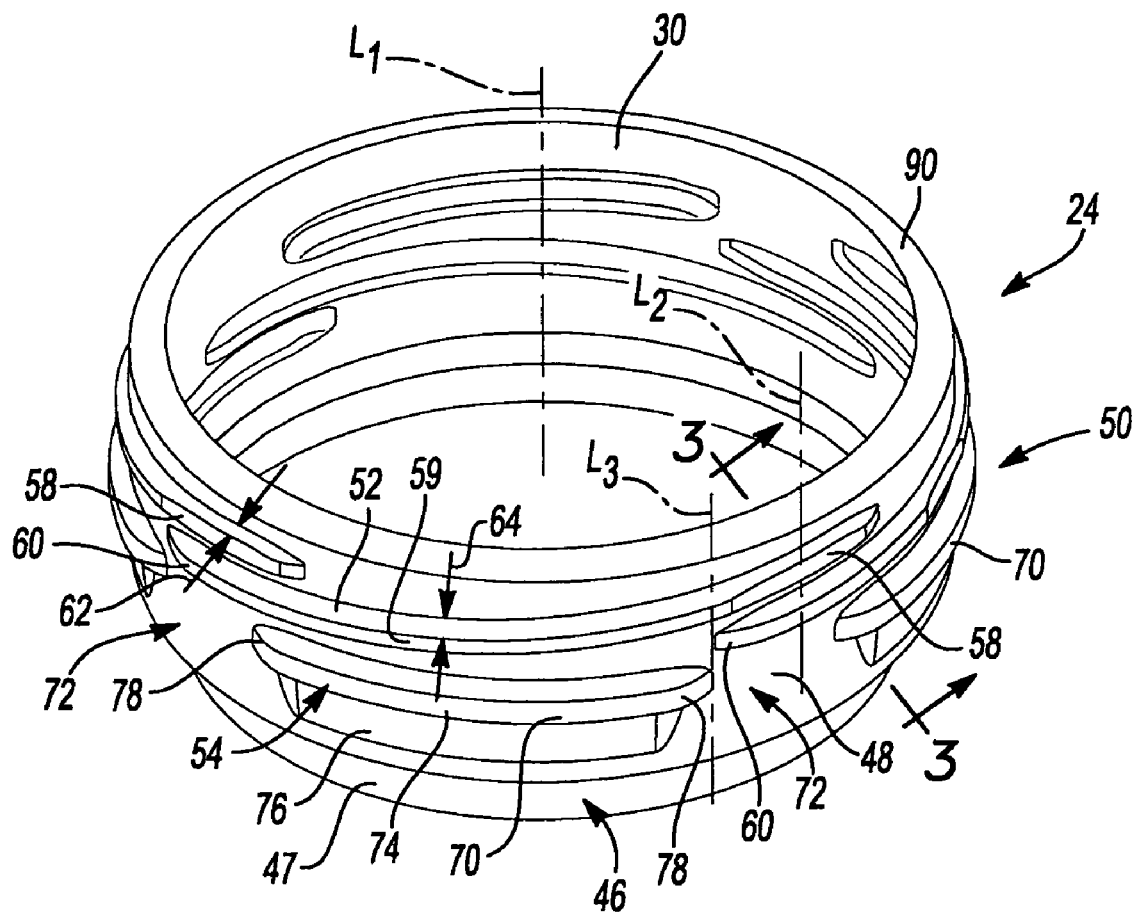
FIG. 2 is a detailed perspective view of a finish of the plastic container shown in FIG. 1.

FIG. 1 shows one embodiment of the present container. In the Figures, reference number 10 designates a one-piece plastic, e.g. polyethylene terephthalate (PET), hot-fillable container. The container 10 is shown with an exemplary cap 12. The cap 12 includes a breakaway band 14. The container 10 and cap 12 are collectively referred to herein as a bottle assembly 18. As shown in FIGS. 1 and 2, the exemplary container 10 defines a longitudinal axis $L_1$ and has an overall height $H_1$ of about 177.10 mm (6.97 inches). The container 10 may be substantially cylindrical in cross section. In this particular embodiment, the container 10 has a volume capacity of about 32 fl. oz. (946 cc). Those of ordinary skill in the art would appreciate that the following teachings are applicable to other containers, such as rectangular, triangular, hexagonal, octagonal or square shaped containers, which may have different dimensions and volume capacities. It is also contemplated that other modifications can be made depending on the specific application and environmental requirements.

The container 10 according to the present teachings defines a body 20 and includes an upper portion 22 having a finish 24. The finish 24 defines an opening 30 into the container 10. Integrally formed with the finish 24 and extending downward therefrom is a shoulder region 32. The shoulder region 32 merges into and provides a transition between the finish 24 and a sidewall portion 36. The sidewall portion 36 extends downward from the shoulder region 32 to a base portion 40 having a base 42. An upper bumper portion 44 may be defined at a transition between the shoulder region 32 and the sidewall portion 36. A lower bumper portion 45 may be defined at a transition between the base portion 40 and the sidewall portion 36. A neck 46 defining a cylindrical sidewall 47 is integrally formed with the finish 24 and extends between the finish 24 and the shoulder region 32. In one example, the cylindrical sidewall 47 can define a uniform radius along its entire height.

The container 10 has been designed to retain a commodity. The commodity may be in any form such as a solid or liquid product. In one example, a liquid commodity may be introduced into the container 10 during a thermal process, typically a hot-fill process. For hot-fill bottling applications, bottlers generally fill the container 10 with a liquid or product at an elevated temperature between approximately 155° F. to 205° F. (approximately 68° C. to 96° C.) and seal the container 10 with the cap 12 before cooling. In addition, the container 10 may be suitable for other high-temperature pasteurization or retort filling processes or other thermal processes as well. In another example, the commodity may be introduced into the container 10 under ambient temperatures.

With continued reference to FIG. 2 and further reference to FIG. 3, the finish 24 will be described in greater detail. The finish 24 of the container 10 generally includes a radial sidewall 48 defining a threaded region 50 having threads 52, and a tamper evident (TE) band 54. Each thread 52 defines a thread start portion 58, a thread intermediate portion 59, and a thread run-out portion 60. As shown, each thread 52 slopes generally away from the opening 30 from the thread start portion 58 to the thread run-out portion 60. In general, a thread start portion 58 of one thread 52 is longitudinally aligned (i.e. aligned in a direction parallel to the longitudinal axis $L_1$ of the container 10) with a thread run-out portion 60 of an adjacent thread 52. As best shown in FIG. 2, each thread 52 defines a first depth 62 at the thread start portion 58 and a second depth 64 at the thread intermediate portion 59. According to the present teachings, the first depth 62 is less than the second depth 64. More specifically, the first depth 62 is approximately 5-50% less than the second depth 64. By reducing the thread depth at the thread start portion 58, an improvement in repeatability of forming the thread run-out portion 60 is realized. In the exemplary finish 24, four (4) threads 52 are included, however additional or fewer threads 52 are contemplated.

The TE band 54 will now be described. The TE band 54 is generally perpendicular to the longitudinal axis $L_1$ of the container 10. The TE band 54 is collectively defined by a plurality of disconnected radial protrusions 70. Each radial protrusion 70 generally defines a body 74 and a ramped support portion 76. The body 74 further defines terminal sloped ends 78. A gap 72 is defined on the radial sidewall 48 of the finish 24 between adjacent radial protrusions 70. Each gap 72 is longitudinally aligned with a respective thread start portion 58 and a thread run-out portion 60. Explained further, a line $L_2$ parallel to the longitudinal axis $L_1$ extends through the thread start portion 58 of a first thread 52, the thread run-out portion 60 of a second thread 52, and the gap 72 (see FIG. 2). Depending on a thread pitch chosen for a given container, the gap 72 can range between approximately 5-32 degrees of the finish diameter. Furthermore, a line $L_3$ parallel to the longitudinal axis $L_1$ extends through a terminal end of the thread run-out portion 60 and a counter-clockwise (as viewed from the opening 30) terminal sloped end 78 of a body 74 (see FIG. 2). The discontinuous nature of the TE band 54 and more specifically the spacing of the gap 72 relative to the thread run-out portion 60 improves the formation of the thread run-out portion 60, and the threads 52 as a whole.

Figure 3:
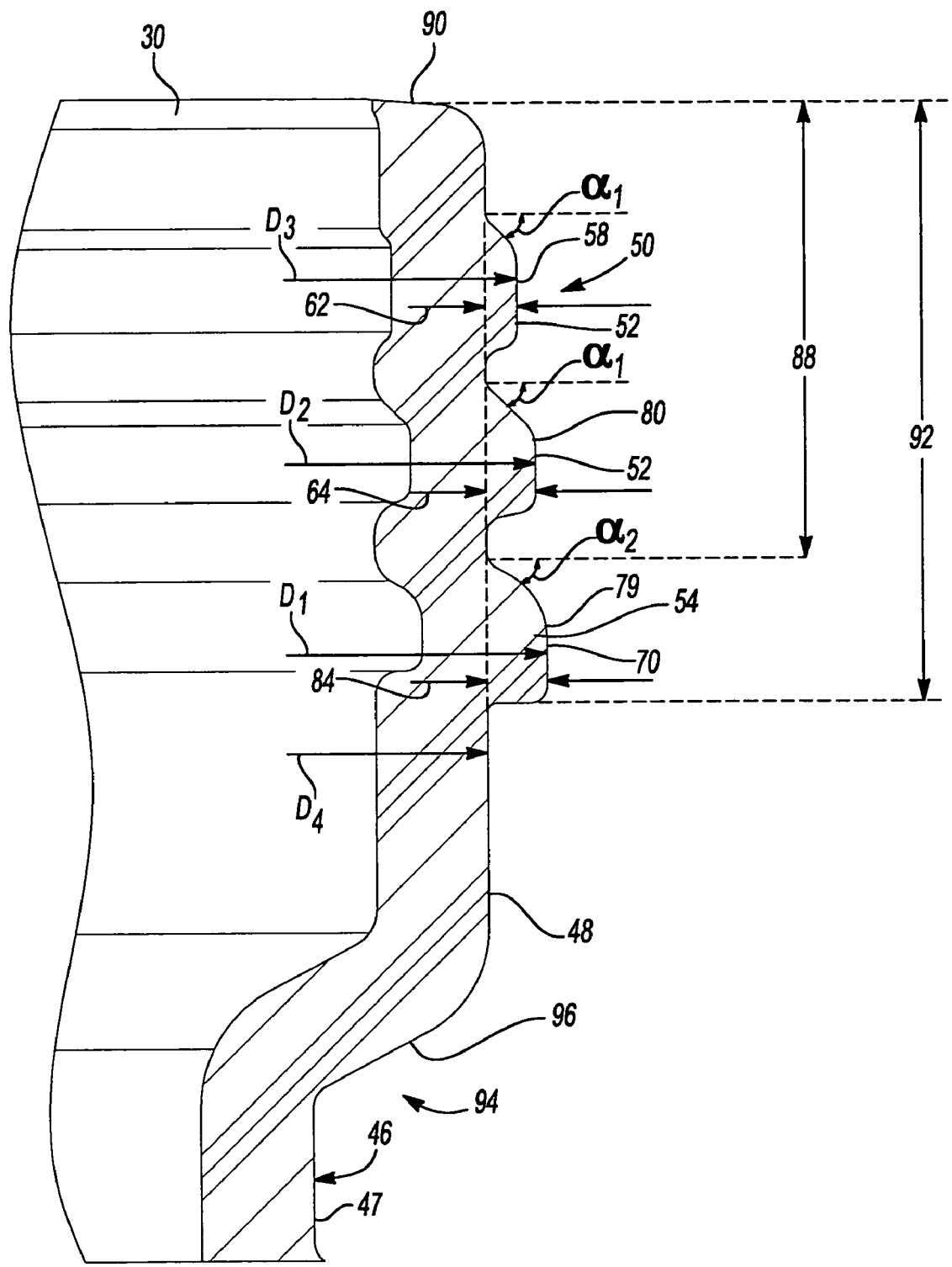
FIG. 3 is a sectional view of the finish taken along line 3-3 of FIG. 2.
Figure 4:
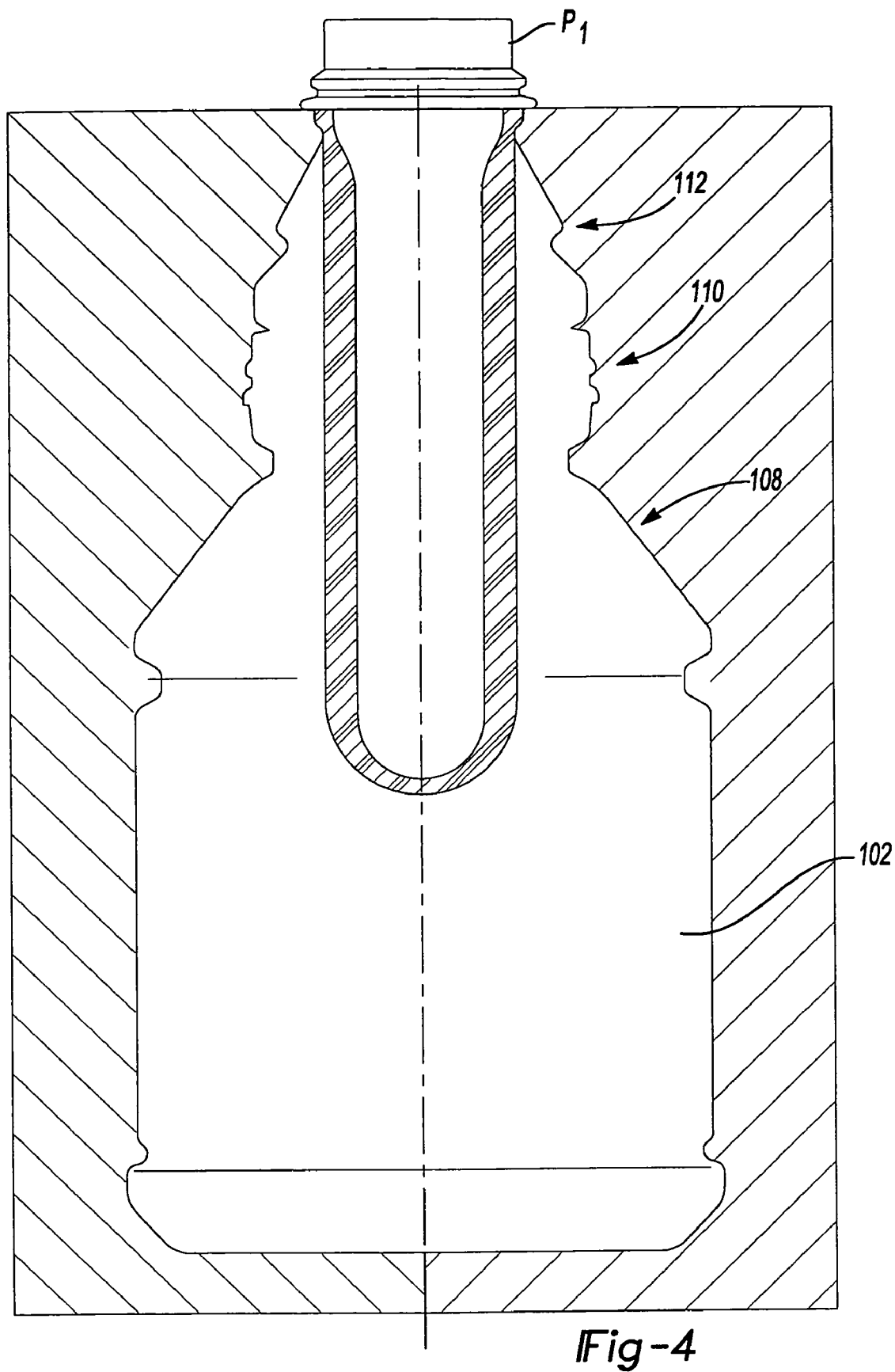
FIG. 4 is a sectional view of an exemplary mold cavity used during formation of the plastic container of FIG. 1 and shown with a preform positioned therein.

With reference to FIG. 3, exemplary dimensions for the finish 24 will be described. It is appreciated that other dimensions may be used. A diameter $D_1$ is defined at an outermost surface 79 of the TE band 54. A diameter $D_2$ is defined at an outermost surface 80 of the thread 52. A diameter $D_3$ is defined at the thread start portion 58. It is appreciated in the example shown, that the relative placement of the threads 52 around the finish 24 allows a diameter to be defined across diametrically opposed outermost surfaces 80 as well as diametrically opposed thread start portions 58. Those skilled in the art will appreciate that such an arrangement is not required.

A diameter $D_4$ is defined by the radial sidewall 48. A TE band depth 84 is defined laterally between the outermost surface 79 of the TE band 54 and the radial sidewall 48. The TE band 54 is formed between a first and second height 88 and 92, respectively on the finish 24. The first height 88 extends between an upper surface 90 of the radial sidewall 48 and an upper boundary of the TE band 54. The second height 92 extends between the upper surface 90 of the radial sidewall 48 and a lower boundary of the TE band 54.

According to one example, the diameter $D_1$ can be 63.02 mm (2.48 inches). The diameter $D_2$ can be 62.08 mm (2.44 inches). The diameter $D_3$ can be 61.32 mm (2.41 inches). The diameter $D_4$ can be 59.99 mm (2.36 inches). An angle $\alpha_1$ of the thread 52 extends from a line perpendicular to the finish 24 to the thread 52 can be about 45 degrees. An angle $\alpha_2$ of the TE band 54 extends from a line perpendicular to the finish 24 to the TE band 54 can be about 30 degrees.

With specific reference to FIGS. 1 and 3, the container 10 defines a debossed support flange 94. The debossed support flange 94 is defined by an inwardly extending wall 96. The inwardly extending wall 96 transitions into the cylindrical sidewall 47 of the neck 46. The debossed support flange 94 can provide a means for holding and/or gripping the container 10. The debossed support flange 94 provides a significant weight reduction of approximately 5-10% or more over a typical blown plastic container that incorporates an outwardly facing support flange.

Because the container 10 defines the debossed support flange 94, the TE band 54 defines an outermost surface of the container 10 above the shoulder region 32. As can be appreciated, once the breakaway band 14 breaks away from the cap 12 upon initial uncapping, the breakaway band, identified in phantom at 14' in FIG. 1, will fall onto the shoulder region 32. In this way, the breakaway band 14' occupies a position offset from the TE band 54 defining a gap 98. The gap 98 is a strong visual aid to a customer in that it helps identify whether or not a container has been opened or tampered with prior to initial opening of the container by the end user. The debossed support flange 94 permits the breakaway band 14 to drop a greater distance, thereby increasing the distance identified by the gap 98 as compared to a typical plastic container incorporating a conventional outwardly facing support flange that would catch the breakaway band 14 at a position above the shoulder region 32.

The container 10 according to FIGS. 1-5 of the present disclosure is a blow molded, biaxially oriented container with a unitary construction from a single or multi-layer material. A well-known stretch-molding, heat-setting process for making the container 10 generally involves the manufacture of a preform $P_1$ (FIG. 4) of a polyester material, such as polyethylene terephthalate (PET), having a shape well known to those skilled in the art similar to a test-tube with a generally cylindrical cross section and a length typically approximately fifty percent (50%) that of the resultant container height.

Figure 5:
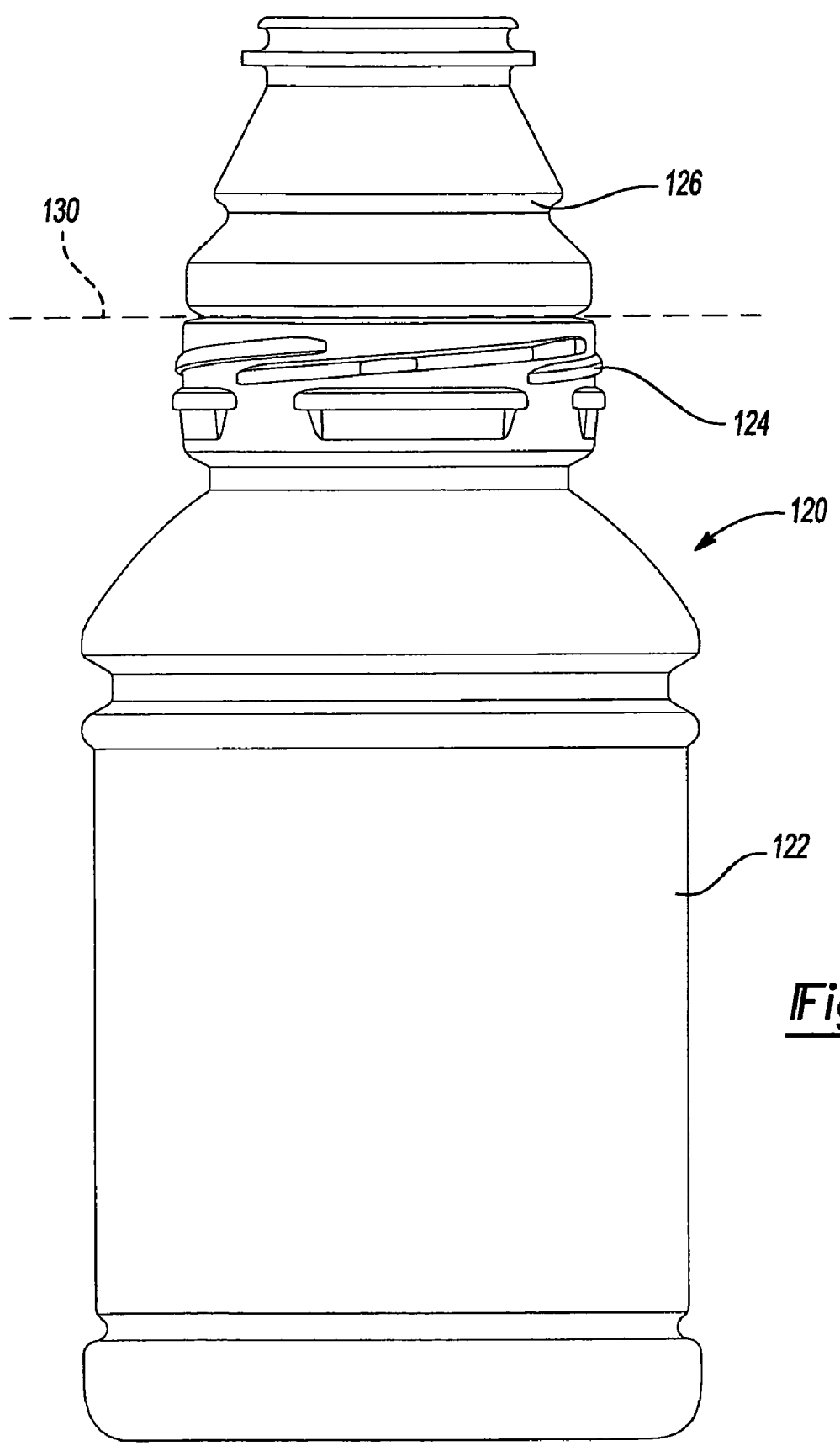
FIG. 5 is a side elevational view of an intermediate container formed in the mold cavity of FIG. 4.

An exemplary method of forming the container 10 will be described. At the outset, the preform $P_1$ may be placed into a mold cavity 102. In general, the mold cavity 102 has an interior surface corresponding to a desired outer profile of the blown container. More specifically, the mold cavity 102 according to the present teachings defines a body-forming region 108, a finish forming region 110 and a moil forming region 112. The resultant structure, hereinafter referred to as an intermediate container 120, as illustrated in FIG. 5, generally includes a body 122, a finish 124 and a moil 126.

In one example, a machine (not illustrated) places the preform $P_1$ heated to a temperature between approximately 190° F. to 250° F. (approximately 88° C. to 121° C.) into the mold cavity 102. The mold cavity 102 may be heated to a temperature between approximately 250° F. to 350° F. (approximately 121° C. to 177° C.). A stretch rod apparatus (not illustrated) stretches or extends the heated preform $P_1$ within the mold cavity 102 to a length approximately that of the intermediate container 120 thereby molecularly orienting the polyester material in an axial direction generally corresponding with the central longitudinal axis $L_1$ of the container 10. While the stretch rod extends the preform $P_1$, air having a pressure between 300 PSI to 600 PSI (2.07 MPa to 4.14 MPa) assists in extending the preform $P_1$ in the axial direction and in expanding the preform $P_1$ in a circumferential or hoop direction thereby substantially conforming the polyester material to the shape of the mold cavity 102 and further molecularly orienting the polyester material in a direction generally perpendicular to the axial direction, thus establishing the biaxial molecular orientation of the polyester material in most of the intermediate container 120. The pressurized air holds the mostly biaxial molecularly oriented polyester material against the inner surface of the mold cavity 102 for a period of approximately two (2) to five (5) seconds before removal of the intermediate container 120 from the mold cavity 102. This process is known as heat setting and results in a heat-resistant container suitable for filling with a product at high temperatures.

In another example, a machine (not illustrated) places the preform $P_1$ heated to a temperature between approximately 185° F. to 239° F. (approximately 85° C. to 115° C.) into the mold cavity 102. The mold cavity 102 may be chilled to a temperature between approximately 32° F. to 75° F. (approximately 0° C. to 24° C.). A stretch rod apparatus (not illustrated) stretches or extends the heated preform $P_1$ within the mold cavity 102 to a length approximately that of the intermediate container 120 thereby molecularly orienting the polyester material in an axial direction generally corresponding with the central longitudinal axis $L_1$ of the container 10. While the stretch rod extends the preform $P_1$, air having a pressure between 300 PSI to 600 PSI (2.07 MPa to 4.14 MPa) assists in extending the preform $P_1$ in the axial direction and in expanding the preform $P_1$ in a circumferential or hoop direction thereby substantially conforming the polyester material to the shape of the mold cavity 102 and further molecularly orienting the polyester material in a direction generally perpendicular to the axial direction, thus establishing the biaxial molecular orientation of the polyester material in most of the intermediate container 120. The pressurized air holds the mostly biaxial molecularly oriented polyester material against the inner surface of the mold cavity 102 for a period of approximately two (2) to five (5) seconds before removal of the intermediate container 120 from the mold cavity 102. This process is utilized to produce containers suitable for filling with product under ambient conditions or cold temperatures.

Alternatively, other manufacturing methods using other conventional materials including, for example, high density polyethylene, polypropylene, polyethylene naphthalate (PEN), a PET/PEN blend or copolymer, and various multi-layer structures may be suitable for the manufacture of container 10. Those having ordinary skill in the art will readily know and understand container manufacturing method alternatives.

Once the intermediate container 120 has been formed, the intermediate container 120 may be removed from the mold cavity 102. As can be appreciated, the intermediate container 120 defines the container 10 (FIG. 1) and the moil 126 prior to formation of the opening 30 (FIG. 2). An intersection between the finish 124 and the moil 126 defines a cutting plane 130 (FIG. 5). The moil 126 is subsequently severed from the finish 124 at the cutting plane 130. The severing process may be any suitable cutting procedure that removes the moil 126 and creates the opening 30.

Figure 6:
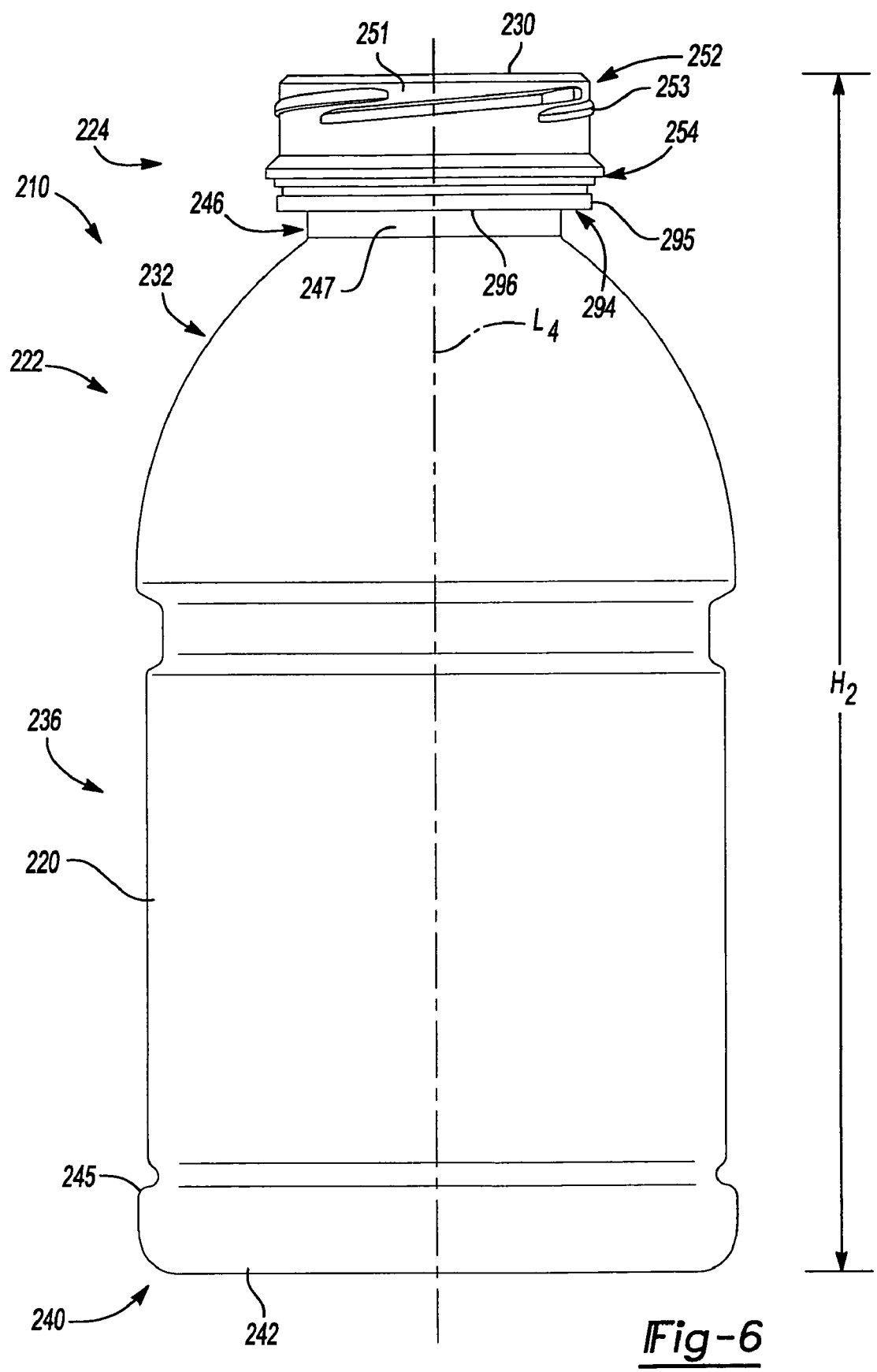
FIG. 6 is side elevational view of a plastic container constructed in accordance to additional features of the present disclosure.

FIG. 6 shows a one-piece plastic, e.g. polyethylene terephthalate (PET), hot-fillable container 210 according to additional features. While not specifically shown, the container 210 can cooperate with a cap having a breakaway band such as the cap 12 illustrated in FIG. 1. As shown in FIG. 6, the exemplary container 210 defines a longitudinal axis $L_4$ and has an overall height $H_2$ of about 158.40 mm (6.24 inches). The container 210 may be substantially cylindrical in cross section. In this particular embodiment, the container 210 has a volume capacity of about 22.9 fl. oz. (678 cc). Those of ordinary skill in the art would appreciate that the following teachings are applicable to other containers, such as rectangular, triangular, hexagonal, octagonal or square shaped containers, which may have different dimensions and volume capacities. It is also contemplated that other modifications can be made depending on the specific application and environmental requirements.

The container 210 according to the present teachings defines a body 220 and includes an upper portion 222 having a finish 224. The finish 224 defines an opening 230 into the container 210. Integrally formed with the finish 224 and extending downward therefrom is a shoulder region 232. The shoulder region 232 merges into and provides a transition between the finish 224 and a sidewall portion 236. The sidewall portion 236 extends downward from the shoulder region 232 to a base portion 240 having a base 242. A lower bumper portion 245 may be defined at a transition between the base portion 240 and the sidewall portion 236. A neck 246 defining a cylindrical sidewall 247 is integrally formed with the finish 224 and extends between the finish 224 and the shoulder region 232. In one example, the cylindrical sidewall 247 can define a uniform radius along its entire height. As will be described in greater detail below, the container 210 also defines a debossed support flange 294.

The container 210 has been designed to retain a commodity. The commodity may be in any form such as a solid or liquid product. In one example, a liquid commodity may be introduced into the container 210 during a thermal processor under ambient temperatures as discussed above with respect to the container 10.

Figure 7:
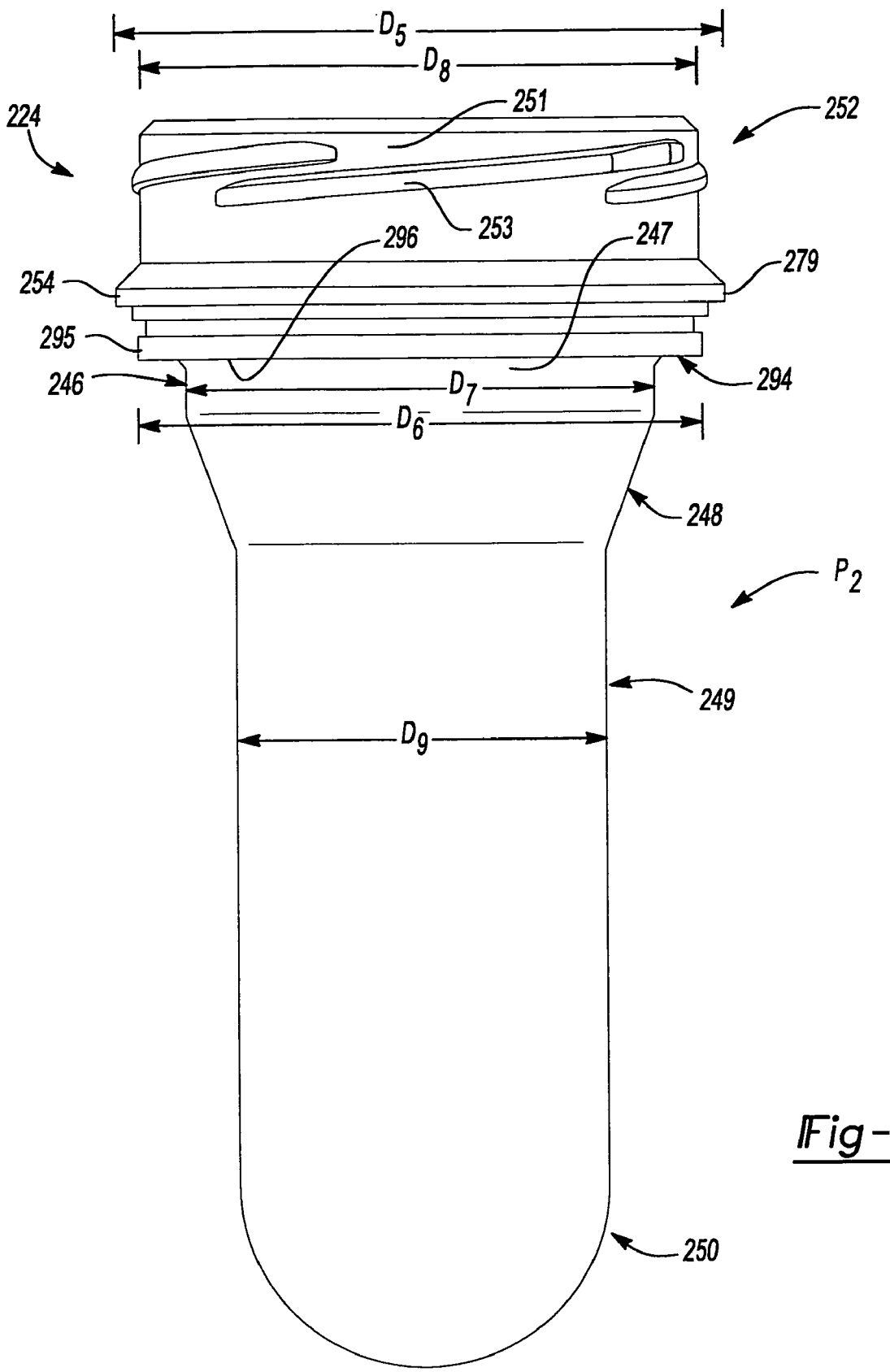
FIG. 7 is a side elevational view of a preform used for construction of the plastic container of FIG. 6.

FIG. 7 illustrates a preform $P_2$ used for blow molding the container 210. As will be described, during blow molding of the container 210, the neck 246 and all of the features above the neck 246 including the debossed support flange 294 and the finish 224 remain substantially in their injection molded state while the container body 220 is formed below the neck 246. For reference purposes, the neck 246, the debossed support flange 294, and the finish 224 of the container 210 are identified with like reference numerals on the preform $P_2$. The preform $P_2$ also defines a shoulder forming region 248, a sidewall forming region 249, and a base forming region 250.

With reference to FIGS. 6 and 7, the finish 224 generally includes a radial sidewall 251 defining a threaded region 252 having threads 253, and a tamper evident (TE) band 254. In the exemplary finish 224, four (4) threads 253 are included, however additional or fewer threads 253 are contemplated. The TE band 254 is generally perpendicular to the longitudinal axis $L_4$ of the container 210. The TE band 254 is continuously formed around the finish 224.

The debossed support flange 294 will now be described. The debossed support flange 294 is defined by an annular ring 295 having an inwardly extending wall 296. The debossed support flange 294 can provide a means for holding and/or gripping the preform $P_2$ throughout the manufacturing process as well as the resultant container 210. The debossed support flange 294 provides a significant weight reduction of approximately 5-10% or more over a typical injection molded preform or blown plastic container that incorporates an outwardly facing support flange. Because the container 210 includes the debossed support flange 294, the TE band 254 defines an outermost surface of the container 210 above the shoulder region 232.

With reference to FIG. 7, exemplary dimensions for the finish 224 will be described. It is appreciated that other dimensions may be used. A diameter $D_5$ is defined at an outermost surface 279 of the TE band 254. A diameter $D_6$ is defined by the debossed support flange 294 at the annular ring 295. A diameter $D_7$ is defined by the cylindrical sidewall 247 of the neck 246. A diameter $D_8$ is defined by the radial sidewall 251 of the finish 224. A diameter $D_9$ is defined by the sidewall forming portion 249 of the preform $P_2$.

According to one example, the diameter $D_5$ can be 43.40 mm (1.75 inches). The diameter $D_6$ can be 40.80 mm (1.61 inches). The diameter $D_7$ can be 37.80 mm (1.49 inches). The diameter $D_8$ can be 39.30 mm (1.55 inches). The diameter $D_9$ can be 27.0 mm (1.07 inches). A ratio of the diameter $D_5$ relative to the diameter $D_6$ can range between approximately 1.5 and preferably be approximately 1.1. A ratio of the diameter $D_6$ relative to the diameter $D_9$ can range between approximately 2.0 and preferably be approximately 1.5. A ratio of the diameter $D_5$ relative to the diameter $D_7$ can range between approximately 1.3 and preferably be approximately 1.1.

Figure 8:
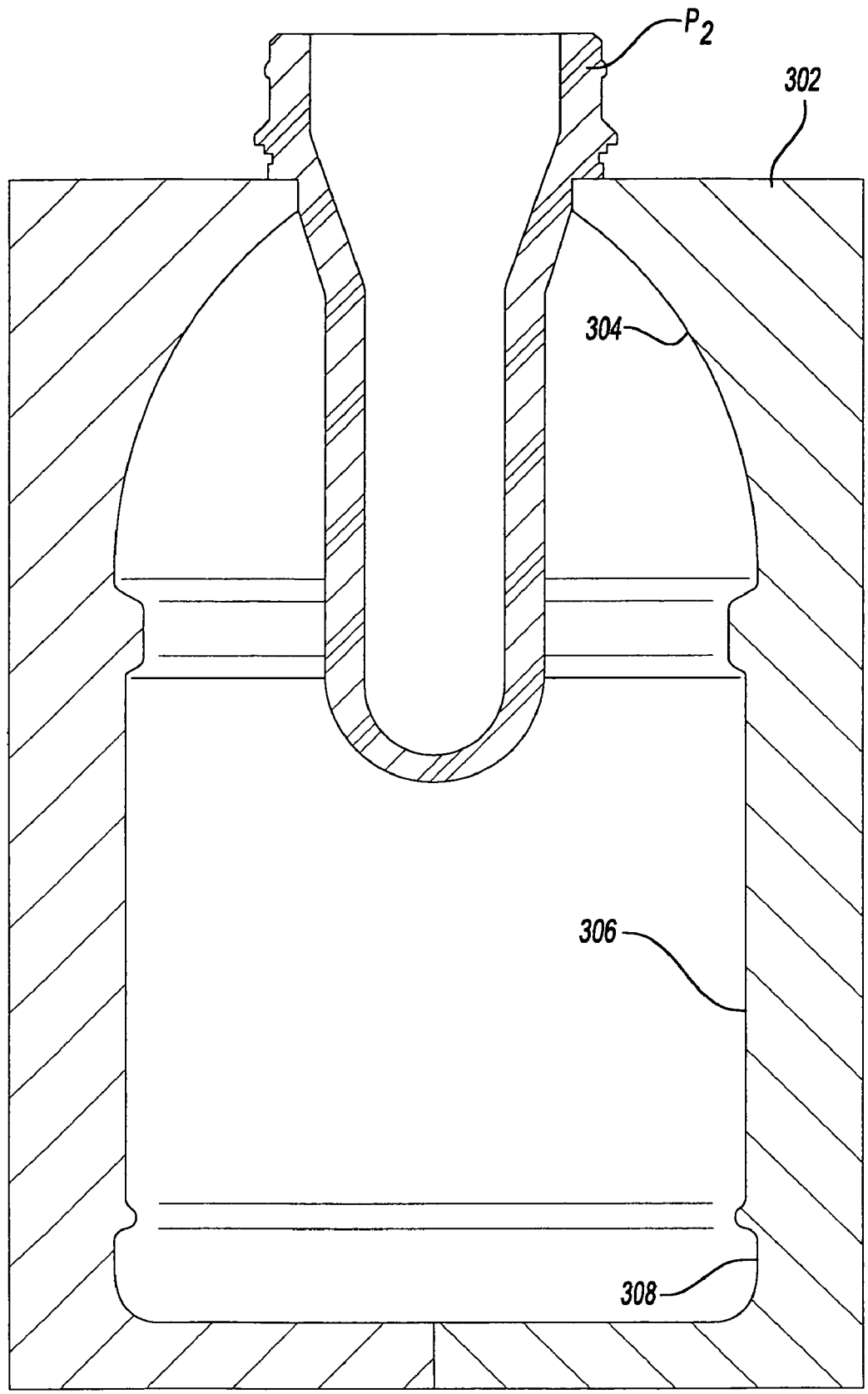
FIG. 8 is a sectional view of an exemplary mold cavity used during formation of the container of FIG. 6 and shown with the preform of FIG. 7 positioned therein.

Turning now to FIG. 8, an exemplary method of forming the container 210 will be described. At the outset, the preform $P_2$ may be placed into a mold cavity 302. In general, the mold cavity 302 has an interior surface corresponding to a desired outer profile of the blown container. More specifically, the mold cavity 302 according to the present teachings defines a shoulder forming region 304, a sidewall forming region 306, and a base forming region 308.

The preform $P_2$ can be heated to a temperature between approximately 190° F. to 250° F. (approximately 88° C. to 121° C.) and placed into the mold cavity 302. The mold cavity 302 may be heated to a temperature between approximately 250° F. to 350° F. (approximately 121° C. to 177° C.). A stretch rod apparatus (not illustrated) stretches or extends the heated preform $P_2$ within the mold cavity 302 to a length approximately that of the resultant container 210 thereby molecularly orienting the polyester material in an axial direction generally corresponding with the central longitudinal axis $L_4$ of the container 210. While the stretch rod extends the preform $P_2$, air having a pressure between 300 PSI to 600 PSI (2.07 MPa to 4.14 MPa) assists in extending the preform $P_2$ in the axial direction and in expanding the preform $P_2$ in a circumferential or hoop direction thereby substantially conforming the polyester material to the shape of the mold cavity 302 and further molecularly orienting the polyester material in a direction generally perpendicular to the axial direction, thus establishing the biaxial molecular orientation of the polyester material in the resultant container 210. The pressurized air holds the mostly biaxial molecularly oriented polyester material against the inner surface of the mold cavity 302 for a period of approximately two (2) to five (5) seconds before removal of the container 210 from the mold cavity 302. Other methods of blow molding the preform $P_2$ into the mold cavity 302 can be used.

While the above description constitutes the present disclosure, it will be appreciated that the disclosure is susceptible to modification, variation and change without departing from the proper scope and fair meaning of the accompanying claims.

What is claimed is:

1. A plastic container comprising:
    an upper portion including a finish defining a longitudinal axis and an opening into the container;
    a shoulder region integrally formed with and extending away from said upper portion, the shoulder region including an upper end, the shoulder region tapering only outward radially as said shoulder region extends away from said upper portion;
    a sidewall portion extending from said shoulder region to a base portion, said base portion closing off an end of the plastic container;
    a tamper evident (TE) band formed on said finish and defining an outermost surface of the plastic container above said shoulder region, the TE band defining a first diameter at said outermost surface;
    a neck defining a cylindrical sidewall integrally formed with and extending between said finish and said upper end of said shoulder region; and
    a debossed support flange defined on said upper portion and extending between said finish and said neck, said debossed support flange defining a second diameter, said first diameter being greater than said second diameter, wherein said debossed support flange tapers inward radially as said debossed support flange extends from said finish toward said neck.

2. The plastic container of claim 1 wherein said neck defines a uniform cylindrical sidewall along its entire height between said finish and said upper end of said shoulder region.

3. The plastic container of claim 1, further comprising at least one thread formed on said finish.

4. The plastic container of claim 3 wherein said TE band defines at least two disconnected radial protrusions and a gap between each respective disconnected radial protrusions.

5. The plastic container of claim 4 wherein each thread of said at least one thread defines a thread start portion and a thread run-out portion.

6. The plastic container of claim 5 wherein said thread run-out portion and said gap are disposed longitudinally such that an imaginary, non-physical line parallel to said longitudinal axis extends through said thread run-out portion and said gap.

7. The plastic container of claim 5 wherein a terminal end of said thread run-out portion and said gap are disposed longitudinally such that an imaginary, non-physical line parallel to said longitudinal axis passes through said terminal end of said thread run-out portion and said gap.

8. The plastic container of claim 5 wherein said at least one thread defines a first thread and a second thread, wherein said first thread defines a first depth at said thread start portion and said second thread defines a second depth at said thread run-out portion, wherein said thread start portion and said thread run-out portion are longitudinally aligned around said finish and said first depth is less than said second depth.

9. The plastic container of claim 8 wherein said first depth is approximately 5-50% less than said second depth.

10. The plastic container of claim 1 wherein said finish is a polyethylene terephthalate (PET) blown finish.

11. A preform adapted to be molded into a plastic container, the preform comprising:
    an upper portion including a finish defining a longitudinal axis and an opening into the plastic container;
    a neck defining a cylindrical sidewall integrally formed with and extending between said finish and an upper end of a shoulder forming portion of the preform, the shoulder forming portion operable for forming a shoulder region of the plastic container, the shoulder region being integrally formed with and extending away from said upper portion, said shoulder region tapering only outward radially as said shoulder region extends away from said upper portion;
    a sidewall forming portion operable for forming a sidewall portion of the plastic container, the sidewall portion extending from said shoulder region to a base portion;
    a base forming portion operable for forming the base portion of the plastic container, said base portion closing off an end of the plastic container;
    a tamper evident (TE) band formed on said finish and defining an outermost surface of the preform above said shoulder forming portion, the TE band defining a first diameter at said outermost surface; and
    a debossed support flange defined on said upper portion and extending between said finish and said neck, said debossed support flange defining a second diameter, said first diameter being greater than said second diameter, wherein said debossed support flange tapers inward radially as said debossed support flange extends from said finish toward said neck.

12. The preform of claim 11, wherein said sidewall forming portion defines a third diameter, wherein a ratio of said second diameter relative to said third diameter is about 1.5.

13. The preform of claim 11, wherein said ratio of said second diameter relative to said third diameter is less than about 1.5.

14. The preform of claim 12 wherein said neck defines a fourth diameter, and further comprising at least one thread extending outwardly from a radial sidewall of said finish, said radial sidewall defining a fifth diameter, wherein said fifth diameter is greater than said third diameter.

15. The preform of claim 14 wherein a ratio of said fifth diameter relative to said fourth diameter is greater than about 1 and less than about 1.5.

16. The preform of claim 15 wherein said ratio of said fifth diameter relative to said fourth diameter is substantially about 1.0.

17. The container of claim 1, wherein said TE band includes a body and a ramped support portion, the body including the outermost surface, and the ramped support portion tapering radially inward as the ramped support portion extends away from the body toward the neck.

18. The container of claim 1, wherein an entirety of said debossed support flange tapers inward radially as said debossed support flange extends from said finish toward said neck.

19. A plastic container comprising:
    an upper portion including a finish defining a longitudinal axis and an opening into the container;
    a shoulder region integrally formed with and extending away from said upper portion, the shoulder region including an upper end, the shoulder region tapering only outward radially as said shoulder region extends away from said upper portion;
    a sidewall portion extending from said shoulder region to a base portion, said base portion closing off an end of the plastic container;
    a tamper evident (TE) band formed on said finish and defining an outermost surface of the plastic container above said shoulder region, the TE band defining a first diameter at said outermost surface;
    a neck defining a cylindrical sidewall integrally formed with and extending between said finish and said upper end of said shoulder region; and a debossed support flange defined on said upper portion and extending between said finish and said neck, said debossed support flange defining a second diameter, said first diameter being greater than said second diameter, wherein the finish includes a radial sidewall defining a threaded region with a plurality of threads and the TE band, and wherein the debossed support flange includes an upper end and a lower end, the radial sidewall transitioning into the upper end of the debossed support flange and the lower end of the debossed support flange transitioning into the neck.

* * * * *

UNITED STATES PATENT AND TRADEMARK OFFICE
CERTIFICATE OF CORRECTION

PATENT NO.        : 8,308,005 B2
APPLICATION NO.   : 12/011975
DATED             : November 13, 2012
INVENTOR(S)       : Michael E. Penny Page 1 of 1

It is certified that error appears in the above-identified patent and that said Letters Patent is hereby corrected as shown below:

In the Specification

Column 2, line 46, after "sidewall" delete "that".

Column 3, line 10, after "is" insert --a--.

Column 5, line 10, after "thread 52" insert --and--.

Column 5, line 12, after "TE band 54" insert --and--.

Column 8, line 15, "Dg" should be --$D_9$--.

In the Claims

Column 9, line 35, Claim 4, "protrusions" should be --protrusion--.

Signed and Sealed this
Twenty-seventh Day of August, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,308,005 B2 | Page 1 of 1 |
| APPLICATION NO. | : 12/011975 | |
| DATED | : November 13, 2012 | |
| INVENTOR(S) | : Penny | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1201 days.

Signed and Sealed this
Twenty-first Day of October, 2014

Michelle K. Lee
*Deputy Director of the United States Patent and Trademark Office*